United States Patent [19]
Chen

[11] Patent Number: 6,123,179
[45] Date of Patent: Sep. 26, 2000

[54] BICYCLE FREEWHEEL HUB

[75] Inventor: Hubert Chen, Taichung Hsien, Taiwan

[73] Assignee: Kun Teng Industry Co., Ltd, Taichung Hsien, Taiwan

[21] Appl. No.: 09/031,360

[22] Filed: Feb. 26, 1998

[51] Int. Cl.[7] .................................................. F16D 41/36
[52] U.S. Cl. ........................... 192/64; 192/46; 192/69.81
[58] Field of Search .............................. 192/64, 46, 69.81

[56] References Cited

U.S. PATENT DOCUMENTS

| | | | |
|---|---|---|---|
| 1,361,757 | 12/1920 | Emerson | 192/64 |
| 1,917,459 | 7/1933 | Pugh | 192/64 |
| 2,181,242 | 11/1939 | Kurzina | 192/64 |
| 3,865,220 | 2/1975 | Thompson | 192/64 X |
| 4,261,452 | 4/1981 | Barrows | 192/46 X |
| 4,271,941 | 6/1981 | Miller | 192/46 X |
| 4,461,375 | 7/1984 | Brown | 192/64 X |
| 4,593,799 | 6/1986 | Ozaki . | |
| 5,129,711 | 7/1992 | Chen . | |
| 5,515,957 | 5/1996 | McConaghy | 192/64 |

FOREIGN PATENT DOCUMENTS

| | | | |
|---|---|---|---|
| 0522983 | 1/1993 | European Pat. Off. | 192/64 |
| 445759 | 4/1936 | United Kingdom | 192/64 |

*Primary Examiner*—Rodney H. Bonck
*Attorney, Agent, or Firm*—Townsend and Townsend and Crew LLP

[57] ABSTRACT

A bicycle freewheel hub includes a hollow hub shell sleeved rotatably on a shaft, a cylindrical driving member sleeved rotatably on the shaft and disposed adjacent to the hub shell, and a clutch unit including first and second clutch members sleeved rotatably on the shaft. The first clutch member is coupled to the driving member. The second clutch member is coupled to the hub shell. Each of the clutch members has an annular end face which extends in a direction substantially perpendicular to the shaft. The annular end face of each of the clutch members has inclined teeth that are arranged annularly around the shaft and that project axially from the annular end face. The annular end face of the second clutch member confronts the annular end face of the first clutch member. The inclined teeth of the second clutch member engage the inclined teeth of the first clutch member when the driving member rotates in a first direction, and disengage therefrom when the driving member rotates in a second direction opposite to the first direction. A spring biases one of the first and second clutch members so as to keep interengagement of the first and second clutch members.

12 Claims, 8 Drawing Sheets

BICYCLE FREEWHEEL HUB

BACKGROUND OF THE INVENTION

1. Field of the Invention

The present invention relates to a bicycle freewheel hub, more particularly to a bicycle freewheel hub which is easy to assemble and which provides an enhanced transmission effect.

2. Description of the Related Art

FIG. 1 illustrates a conventional bicycle freewheel hub which includes a shaft 2, and a tubular hub shell 1 sleeved rotatably on the shaft 2 and having a first end formed with a ball recess 1b and a second end opposite to the first end. A first bearing assembly is received in the ball recess 1b and is disposed around the shaft 2. The first bearing assembly includes a ball casing 1c, a ball seat 1d, a securing member 1e and a nut 1f. A positioning seat 3a is sleeved rotatably on the shaft 2, and has a first end fixed to the second end of the hub shell 1. A tubular driving member 3c is disposed around the positioning seat 3a. As shown in FIG. 2, the positioning seat 3a has an outer periphery formed with two opposite radial indentions 3a', each of which is provided with a clutch member 3b and a spring member 3d for biasing the clutch member 3b radially outward. The driving member 3c has an inner surface confronting the outer periphery of the positioning seat 3a and formed with a plurality of ratchet teeth 3c' for engaging the clutch members 3b. A second bearing assembly is received in the driving member 3c and is disposed around the shaft 2. The second bearing assembly includes ball seats 3e, 3e', a securing member 3f, a tubular member 3g and a nut 3h.

When the driving member 3c is rotated in a first direction to advance a bicycle, the ratchet teeth 3c' of the driving member 3c engage the clutch members 3b of the positioning seat 3a to result in rotation of the positioning seat 3a together with the driving member 3c, thereby causing corresponding rotation of the hub shell 1. When the driving member 3c is rotated in a second direction opposite to the first direction, the ratchet teeth 3c' are disengaged from the clutch members 3b to result in idle rotation of the driving member 3c relative to the positioning seat 3a and the hub shell 10.

Although the conventional bicycle freewheel hub achieves the desired transmission effect, it suffers from the following drawbacks:

Since only two clutch members 3b are provided for coupling the driving member 3c to the positioning seat 3a when the driving member 3c is rotated in the first direction, the resulting coupling effect is not satisfactory. In case one of the clutch members 3b is damaged, the coupling effect would be affected significantly. Moreover, the clutch members 3b and the spring members 3d must be mounted on the radial indentions 3a' of the positioning seat 3a when manufacturing the positioning seat 3a. In assembly, the clutch members 3b must be forced inwardly so that the positioning seat 3a can be placed within the driving member 3c. Inconveniences thus result during manufacturing and assembly of the conventional bicycle freewheel hub.

SUMMARY OF THE INVENTION

The main object of the present invention is to provide a bicycle freewheel hub which provides an enhanced transmission effect and which is easy to manufacture and assemble.

Accordingly, the bicycle freewheel hub of the present invention includes a shaft, a hollow hub shell, a cylindrical driving member, a clutch unit and spring means. The hollow hub shell is sleeved rotatably on the shaft, and has first and second ends. The cylindrical driving member is sleeved rotatably on the shaft, and has a first end disposed adjacent to the second end of the hub shell. The clutch unit includes first and second clutch members sleeved rotatably on the shaft. The first clutch member is coupled to the first end of the driving member, and has an annular end face which extends in a direction substantially perpendicular to the shaft. The annular end face has inclined teeth that are arranged annularly around the shaft and that project axially from the annular end face. The second clutch member is coupled to the second end of the hub shell, and has an annular end face which extends in a direction substantially perpendicular to the shaft and which confronts the annular end face of the first clutch member. The annular end face of the second clutch member has inclined teeth that are arranged annularly around the shaft and that project axially from the annular end face of the second clutch member to engage the inclined teeth of the first clutch member when the cylindrical driving member rotates in a first direction and to disengage therefrom when the cylindrical driving member rotates in a second direction opposite to the first direction. The spring means biases one of the first and second clutch members so as to keep interengagement of the first and second clutch members.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
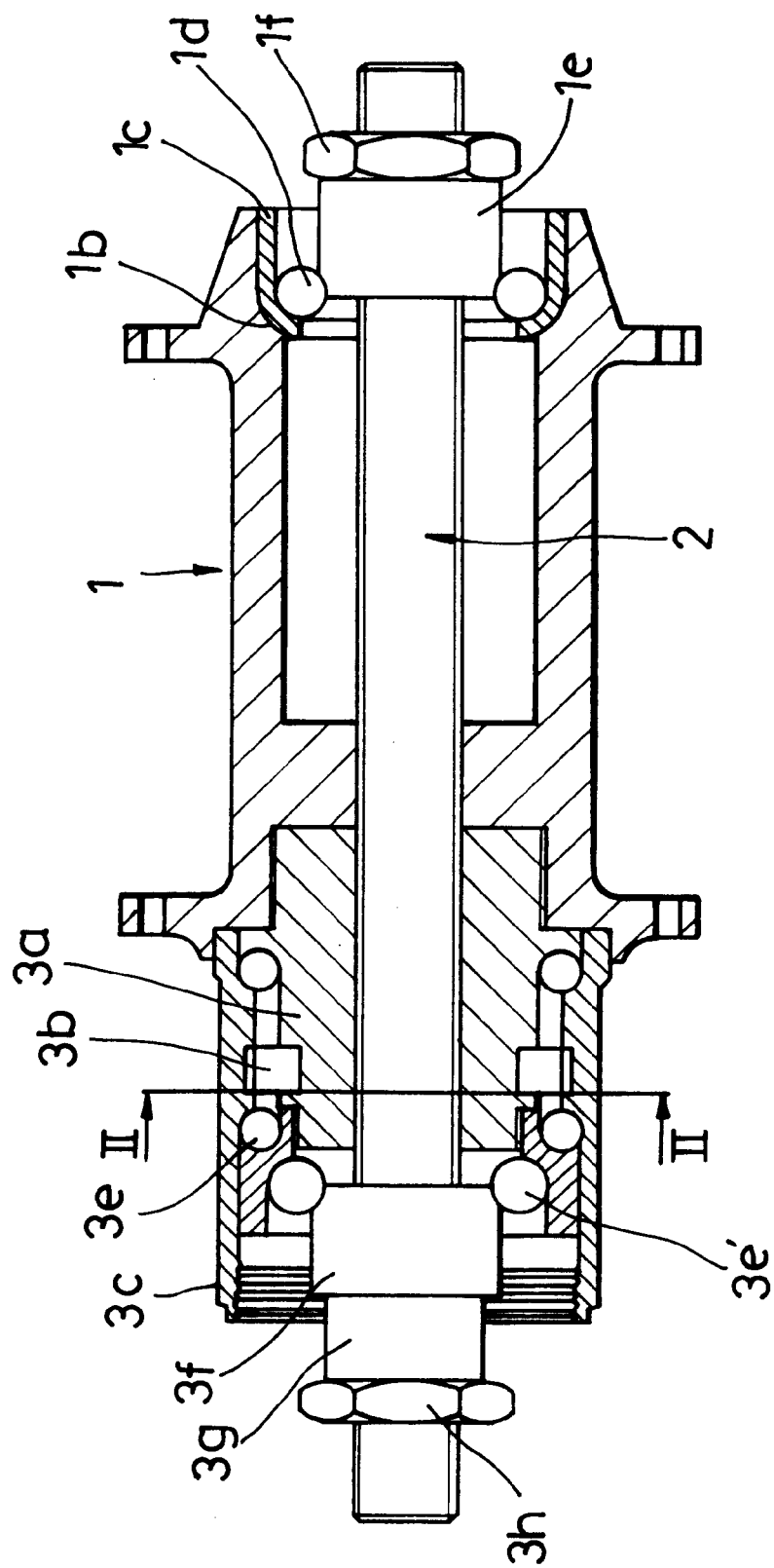
FIG. 1 is a longitudinal sectional view of a conventional bicycle freewheel hub.
Figure 2:
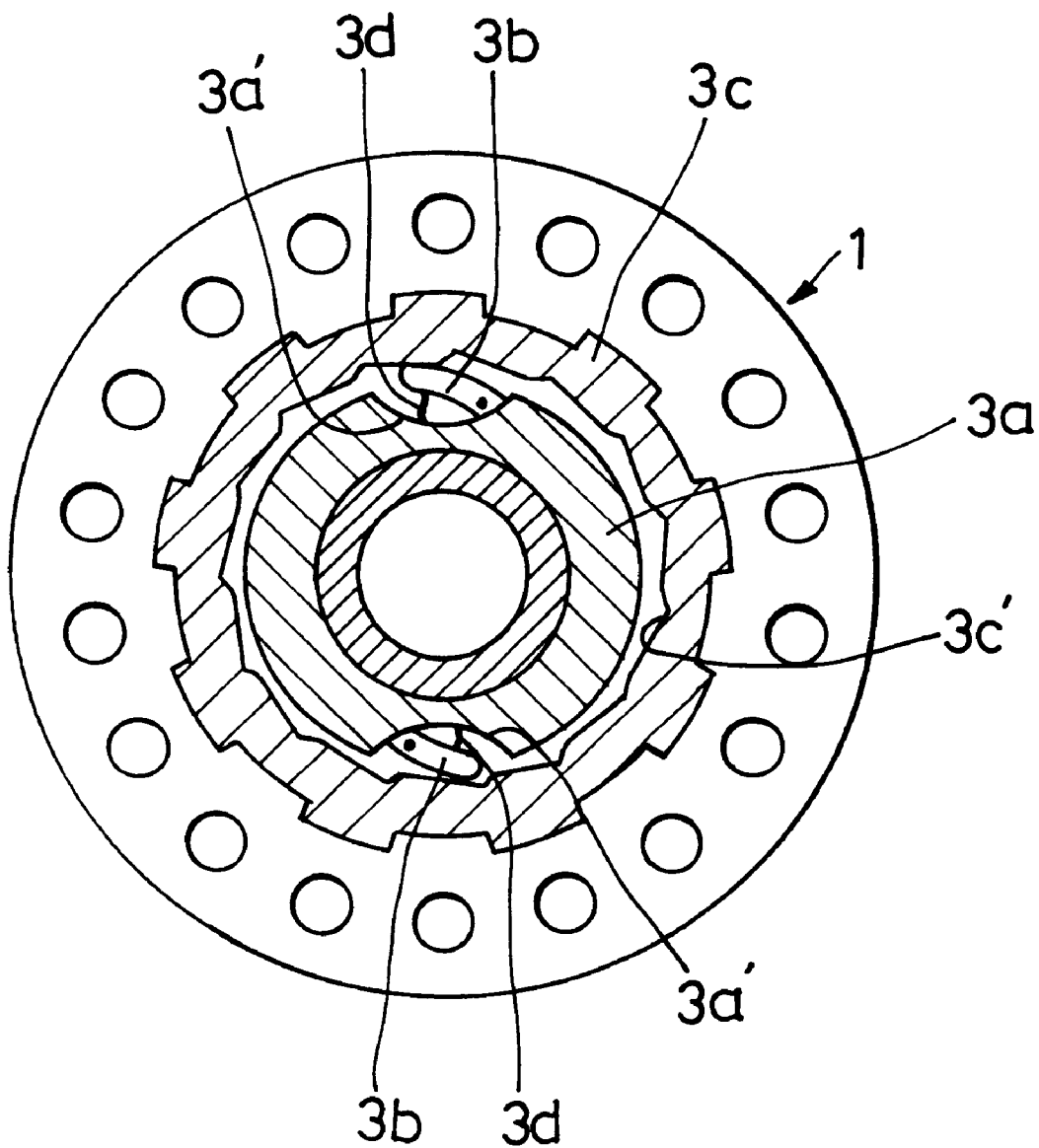
FIG. 2 is a cross-sectional view of the conventional bicycle freewheel hub, taken along line II—II of FIG. 1.
Figure 3:
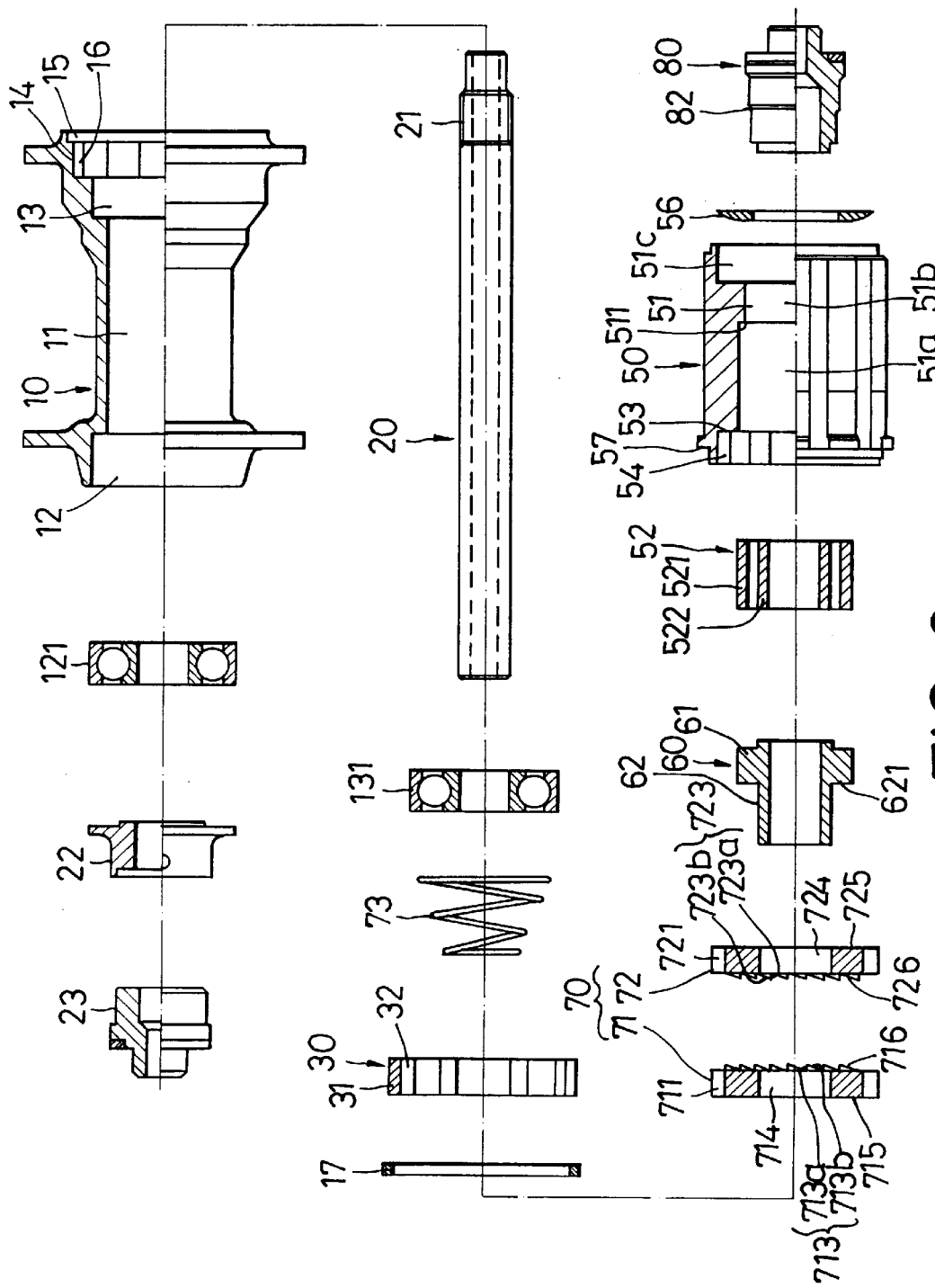
FIG. 3 is an exploded sectional view of a preferred embodiment of a bicycle freewheel hub of the present invention.
Figure 4:
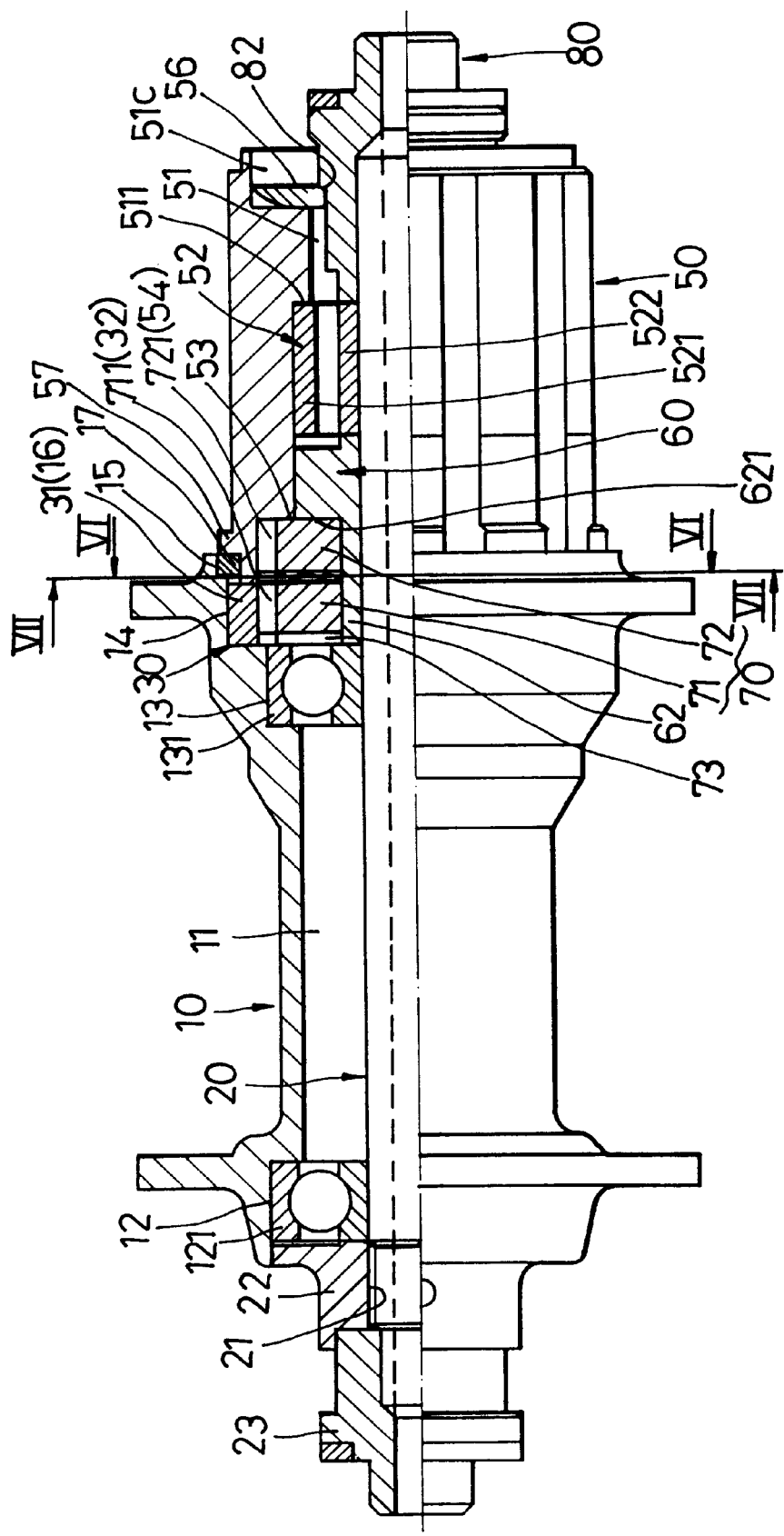
FIG. 4 is a longitudinal sectional view of the preferred embodiment.

Referring to FIGS. 3 and 4, the bicycle freewheel hub of the preferred embodiment of the present invention is shown to include a tubular hub shell 10, an elongated shaft 20, a coupling ring 30, a hollow cylindrical driving member 50, a tubular clutch seat 60, a clutch unit 70, a spiral coiled spring 73 and a plurality of bearings.

The tubular hub shell 10 is made of aluminum and confines an axial hole 11 therein. The axial hole 11 includes a large-diameter first bearing hole portion 12 at a first end of the hub shell 10 for receiving a first ball bearing 121. The axial hole 11 further includes, at a second end of the hub shell 10, a large-diameter second bearing hole portion 13, an annular groove 14 adjacent to the second bearing hole portion 13, and an annular recess 15 adjacent to the annular groove 14. A second ball bearing 131 is received in the second bearing hole portion 13. The annular recess 15 has a cross-section larger than that of the annular groove 14, which has a diameter larger than that of the second bearing hole portion 13. The second end of the hub shell 10 has an inner surface that confines the annular groove 14 and that is formed with a plurality of axially extending and annularly spaced first recesses 16. A sealing ring 17 made of resilient rubber material is received in the annular recess 15 to prevent entrance of moisture and dust into the axial hole 11.

The shaft 20 extends axially through the hub shell 10, and has opposite first and second ends disposed out of the hub shell 10. The first and second ball bearings 121, 131 are sleeved around the shaft 20 so that the hub shell 10 is rotatable relative to the shaft 20. The shaft 20 has a threaded section 21 adjacent to the first end thereof for engaging threadedly a threaded first securing member 22, and has a second securing member 23 sleeved fixedly on the first end thereof.

Figure 6:
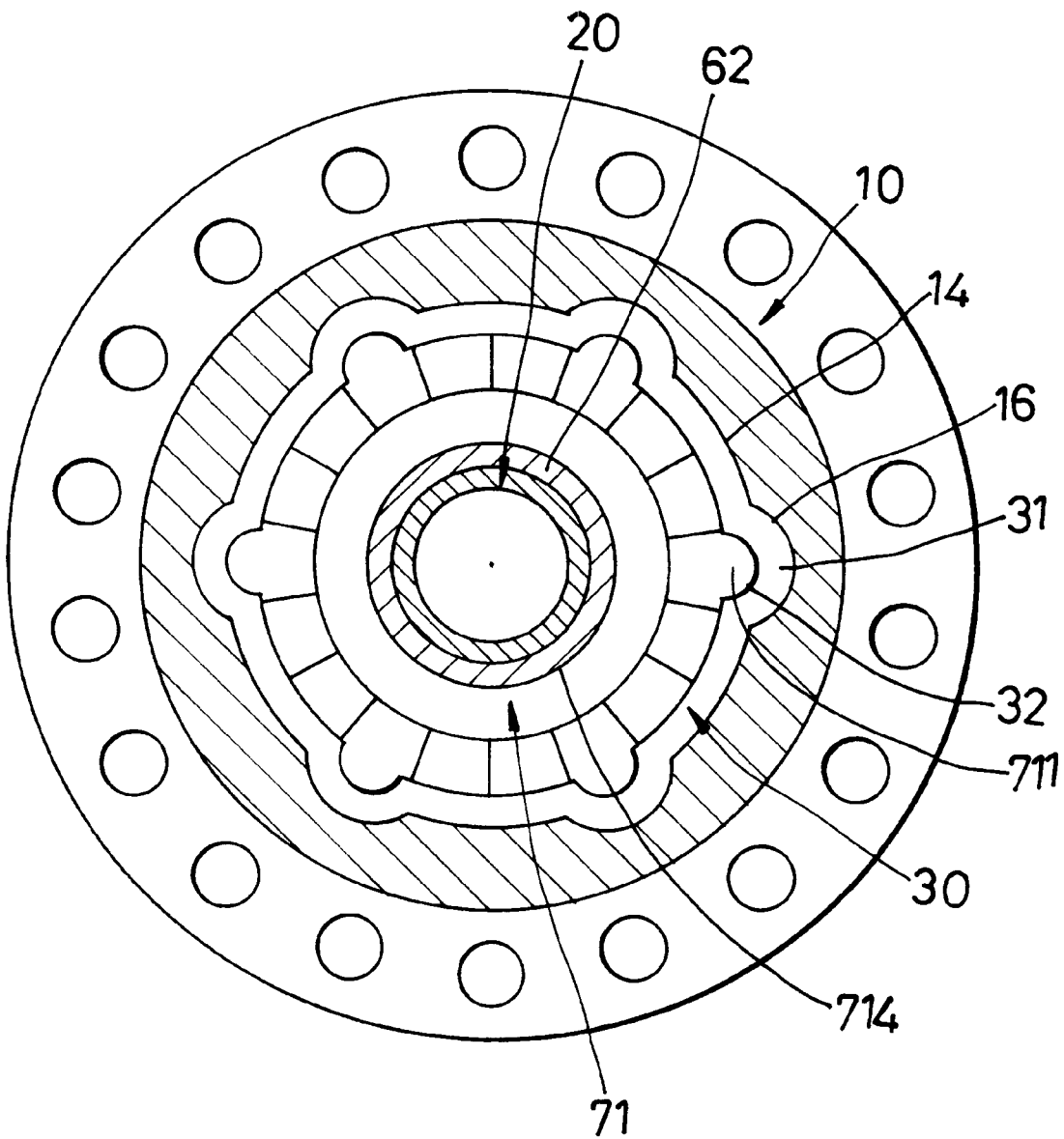
FIG. 6 is a cross-sectional view of the preferred embodiment, taken along line VI—VI in FIG. 4.

The coupling ring 30 is made of iron having good strength, and is received fittingly in the annular recess 14 of the hub shell 10. The coupling ring 30 has an outer surface formed with a plurality of radially projecting and axially extending projections 31, and an inner surface formed with a plurality of axially extending and annularly spaced second recesses 32 opposite to the projections 31. As shown in FIG. 6, each of the projections 31 of the coupling ring 30 has a convex surface while each of the first recesses 16 has a concave face that complements a respective one of the projections 31. The projections 31 of the coupling ring 30 mesh respectively with the first recesses 16 in the annular groove 14 of the hub shell 10 so that the coupling ring 30 is fitted tightly in the annular groove 14 and is coupled to the second end of the hub shell 10 for co-rotation with the hub shell 10 relative to the shaft 20.

Referring again to FIGS. 3 and 4, the cylindrical driving member 50 has a first end which is disposed adjacent to the second end of the hub shell 10 and which has an inner surface formed with an annular groove 53 adjacent to and communicated with the annular groove 14 of the hub shell 10, and an outer surface formed with a radial flange 57 to abut against the sealing ring 17 in the annular recess 15 of the hub shell 10. The inner surface of the first end of the driving member 50 is further formed with a plurality of axially extending and annularly spaced third recesses 54. The driving member 50 has a stepped through-hole 51 that extends from the annular groove 53 to a second end of the driving member 50 opposite to the first end thereof. The through-hole 51 has a first section 51a which is adjacent to the annular groove 53 and which has a cross-section smaller than that of the annular groove 53, a second section 51b which is formed adjacent to the first section 51a and which has a cross-section smaller than that of the first section 51a to form a shoulder 511 between the first and second sections 51a, 51b, and a third section 51c which is formed at the second end of the driving member 50 adjacent to the second section 51b and which has a cross-section greater than that of the second section 51b. A needle bearing 52 is received in the first section 51a of the driving member 50 around the shaft 20. The needle bearing 52 has an inner race 522 in contact with the shaft 20, and an outer race 521 in contact with the driving member 50 so that the driving member 50 is freely rotatable relative to the shaft 20. As shown, the needle bearing 52 abuts against the shoulder 511 in the through-hole 51 so as to be positioned in the through-hole 51. An oil-sealing ring 56 is received in the third section 51c of the through-hole 51 of the driving member 50.

The tubular clutch seat 60 is sleeved fixedly around the shaft 20 within the hub shell 10 and the driving member 50, and extends from the annular groove 14 of the hub shell 10 to the first section 51a of the through-hole 51 of the driving member 50. The tubular clutch seat 60 is disposed adjacent to the needle bearing 52, and is in contact with the inner race 522 of the needle bearing 52. The tubular clutch seat 60 has an outer surface formed with an annular radial flange 61 to define a sleeve section 62 on the clutch seat 60 and to form a shoulder 621 between the sleeve section 62 and the flange 61. As shown in FIG. 4, the sleeve section 62 extends through the annular groove 53 of the driving member 50 and the annular recess 14 of the hub shell 10 so as to be in contact with an inner race of the ball bearing 131.

The clutch unit 70 includes a first clutch member 72 and a second clutch member 71 which are formed as annular discs with central holes 724, 714 and which are sleeved rotatably around the sleeve section 62 of the tubular clutch seat 60. The first clutch member 72 is received in the annular groove 53 of the first end of the driving member 50, and abuts against the shoulder 621 of the clutch seat 60. The second clutch member 71 is disposed inside the coupling ring 30 which, in turn, is received in the annular groove 14 of the hub shell 10. A coiled spiral spring 73 is disposed around the shaft 20 between the second ball bearing 131 and the second clutch member 71.

Figure 5:
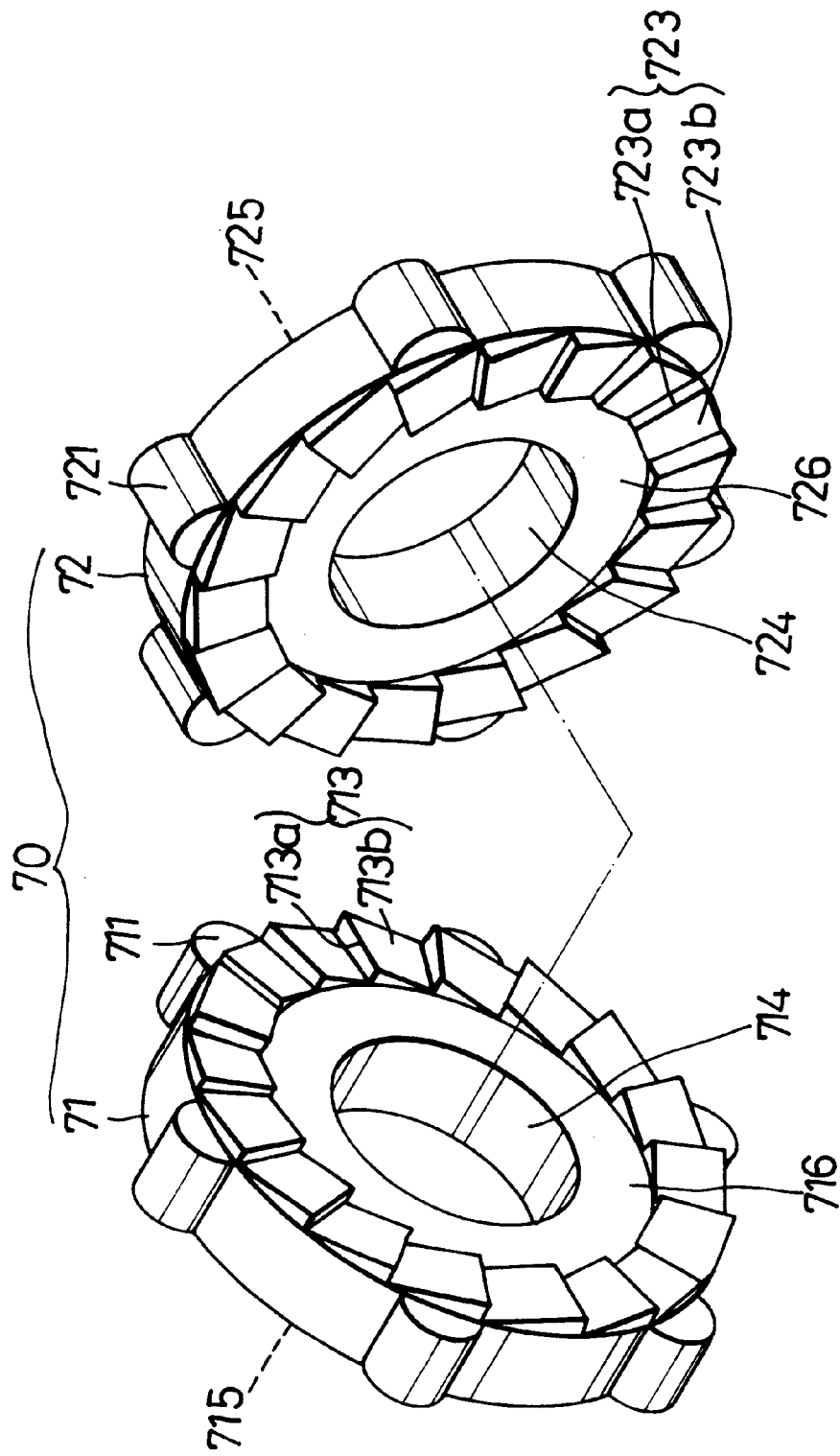
FIG. 5 is an exploded perspective view illustrating a clutch unit of the bicycle freewheel hub of the preferred embodiment.

Referring to FIGS. 3 and 5, the first clutch member 72 has two opposite end faces, one of which defines an annular end face 726 that extends in a direction substantially perpendicular to the shaft 20. The other end face 725 of the first clutch member 72 is substantially planar and extends perpendicular to the shaft 20. The annular end face 726 of the first clutch member 72 is formed with a plurality of inclined teeth 723 which are arranged annularly around the shaft 20 and which project axially from the annular end face 726. Each of the inclined teeth 723 is defined by a first radially extending surface 723a that projects perpendicularly from the annular end face 726, and an inclined second surface 723b that extends slantwise from the annular end face 726 to a distal end of the first radially extending surface 723a. The first clutch member 72 has an outer periphery provided with a plurality of radially projecting and axially extending projections 721 at intervals. Each of the projections 721 has a convex surface.

The second clutch member 71 has the same size and shape as the first clutch member 72. The second clutch member 71 also has two opposite end faces, one of which defines an annular end face 716 that extends in a direction substantially perpendicular to the shaft 20. The other end face 715 of the second clutch member 71 is substantially planar and extends perpendicular to the shaft 20. The annular end face 716 is placed opposite to the annular end face 726 of the first clutch member 72. The spiral spring 73 has a first end with a larger diameter that abuts against an outer race of the second ball bearing 131, and an opposite second end with a smaller diameter that abuts against the planar end face 715 of the second clutch member 71 for biasing the second clutch member 71 toward the first clutch member 72. The annular end face 716 of the second clutch member 71 is formed with a plurality of inclined teeth 713 which are arranged annularly around the shaft 20 and which project axially from the annular end face 716. Each of the inclined teeth 713 is defined by a first radially extending surface 713a that projects perpendicularly from the annular end face 716, and an inclined second surface 713b that extends slantwise from the annular end face 716 to a distal end of the first radially extending surface 713a. The inclined teeth 713 of the second clutch member 71 complement the inclined teeth 723 of the first clutch member 72. The first radially extending surfaces 713a of the inclined teeth 713 on the second clutch member 71 confront the first radially extending surfaces 723a of the inclined teeth 723 on the first clutch member 72. The inclined second surfaces 713b of the inclined teeth 713 on the second clutch member 71 confront the inclined second surfaces 723b of the inclined teeth 723 on the first clutch member 72. The second clutch member 71 has an outer periphery provided with a plurality of radially projecting and axially extending projections 711 at intervals. Each of the projections 711 has a convex surface.

Figure 7:
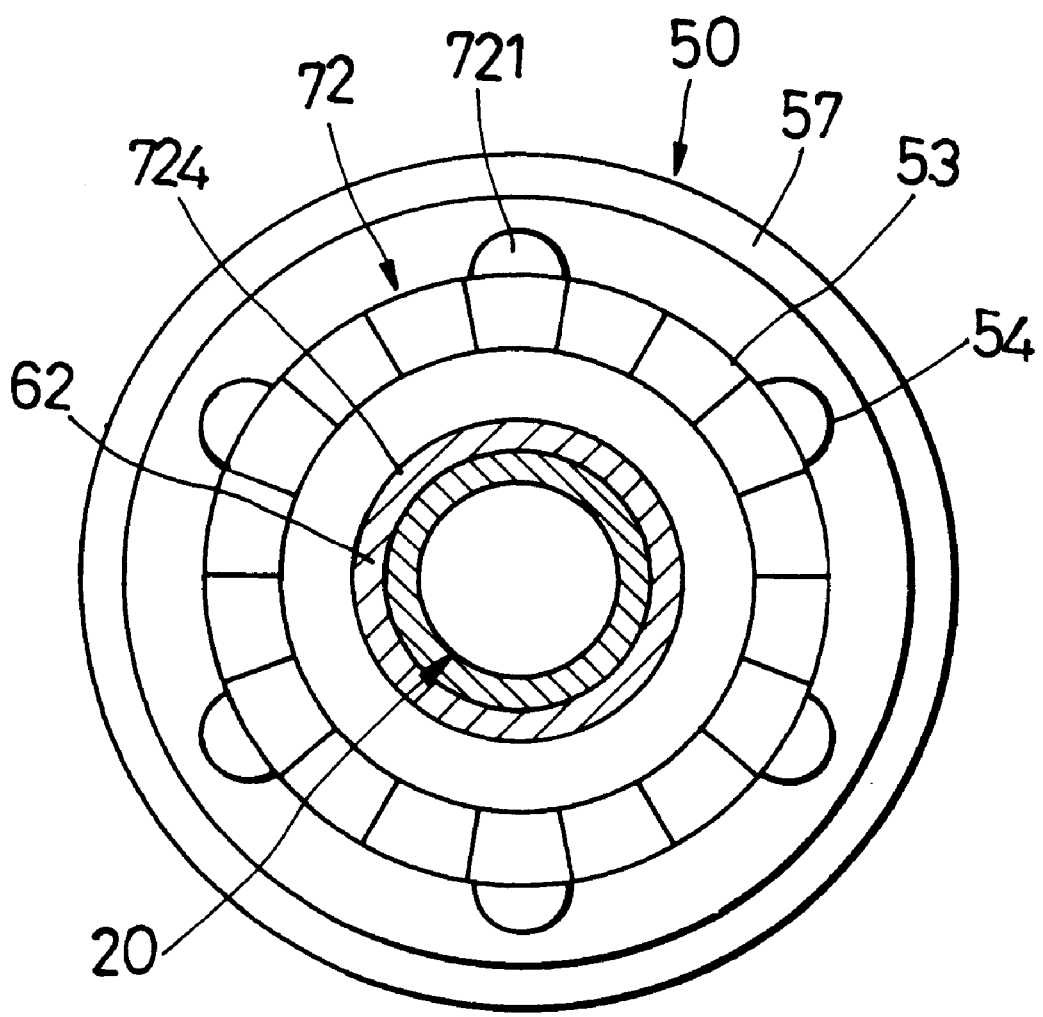
FIG. 7 is another cross-sectional view of the preferred embodiment, taken along line VII—VII in FIG. 4.

Referring to FIG. 7, each of the third recesses 54 in the annular groove 53 of the driving member 50 has a concave face that complements the convex surface of a respective one of the projections 721 of the first clutch member 72 such that the projections 721 can be fitted tightly and respectively into the third recesses 54 of the driving member 50 to prevent axial sliding movement of the first clutch member 72 relative to the driving member 50 as well as relative rotation between the driving member 50 and the first clutch member 72. The first clutch member 72 is thus coupled to the first end of the driving member 50 so as to be rotatable with the driving member 50 relative to the shaft 20.

Referring to FIG. 6, each of the second recesses 32 of the coupling ring 30 has a concave face that complements the convex surface of a respective one of the projections 711 of the second clutch member 71. The projections 711 of the second clutch member 71 extend fittingly and respectively into the second recesses 32 of the coupling ring 30 so that the second clutch member 71 is coupled to the coupling ring 30 and thus, to the second end of the hub shell 10. The projections 711 are slidable axially in the second recesses 32 to permit axial movement of the second clutch member 71 in the coupling ring 30.

Referring again to FIGS. 3 and 4, a tubular securing member 80 extends into the second end of the driving member 50, and is sleeved tightly on the second end of the shaft 20. The securing member 80 has an outer surface formed with a step portion 82 therearound. The step portion 82 abuts against the oil-sealing ring 56 for retaining the oil-sealing ring 56 in the third section 51c of the stepped through-hole 51 of the driving member 50.

Figure 8:
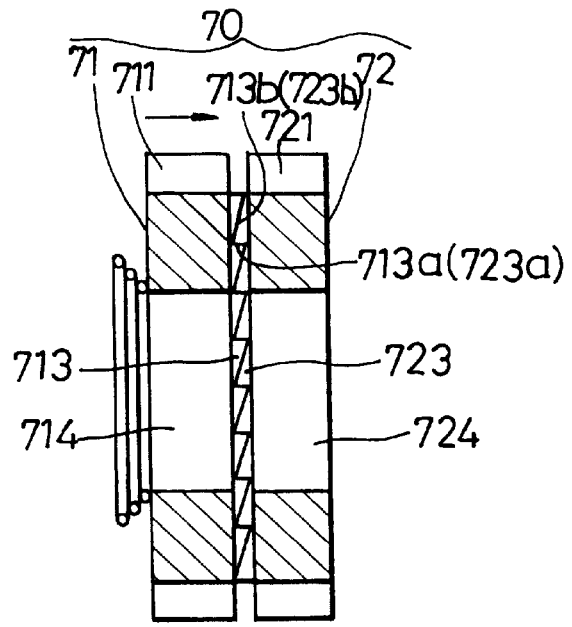
FIG. 8 is a schematic, sectional view of a clutch unit and a biasing spring of the preferred embodiment, illustrating how a first clutch member engages a second clutch member of the clutch unit.

Normally, the spiral spring 73 expands to bias the second clutch member 71 toward the first clutch member 72 so that the inclined teeth 713 of the second clutch member 71 mesh with the inclined teeth 723 of the first clutch member 72, as shown in FIG. 8. At this time, the first radially extending surfaces 723a of the inclined teeth 723 on the first clutch member 72 are in contact with the first radially extending surfaces 713a of the inclined teeth 713 on the second clutch member 71, and the inclined second surfaces 723b of the inclined teeth 723 on the first clutch member 72 are in contact with the inclined second surfaces 713b of the inclined teeth 713 on the second clutch member 71. When the driving member 50 (see FIG. 4) is driven by a drive chain (not shown) of the bicycle to rotate in a first direction to advance a bicycle, the first clutch member 72 is rotated together with the driving member 50 since the first clutch member 72 is fitted tightly within the annular groove 53 of the driving member 50. Under this condition, the inclined teeth 713 of the second clutch member 71 engage the inclined teeth 723 of the first clutch member 72, and the first radially extending surfaces 713a of the inclined teeth 713 on the second clutch member 71 are pushed by the first radially extending surfaces 723a of the inclined teeth 723 on the first clutch member 72 to result in co-rotation of the second clutch member 71 together with the first clutch member 72. Since the second clutch member 71 is coupled to the coupling ring 30 which, in turn, is coupled to the second end of the hub shell 10, the hub shell 10 rotates with the second clutch member 71. In this manner, rotation is transmitted from the driving member 50 to the hub shell 10 to result in rotation of the rear wheel (not shown) of the bicycle for advancing the bicycle.

Figure 9:
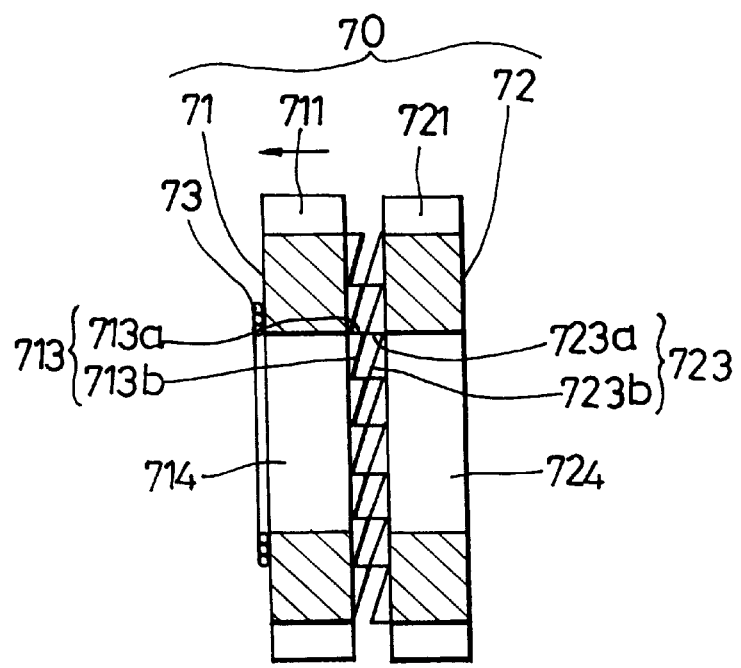
FIG. 9 is another schematic, sectional view of the clutch unit and the biasing spring of the preferred embodiment, illustrating how the second clutch member is disengaged from the first clutch member.

When the driving member 50 is driven by the drive chain of the bicycle to rotate in a second direction opposite to the first direction, as shown in FIG. 9, the inclined second surfaces 713b of the inclined teeth 713 on the second clutch member 71 are pushed by the inclined second surfaces 723b of the inclined teeth 723 on the first clutch member 72 so that the second clutch member 71 moves away from the first clutch member 72 to compress the spiral spring 73 and disengage the inclined teeth 713 from the inclined teeth 723. After the inclined second surfaces 723b of the inclined teeth 723 on the first clutch member 72 move past the distal ends of the first radially extending surfaces 713a of the inclined teeth 713 on the second clutch member 71, the inclined teeth 713 mesh once again with the inclined teeth 723, and the second clutch member 71 moves toward the first clutch member 72 due to the biasing force of the spiral spring 73. In this manner, the second clutch member 71 moves toward and away from the first clutch member 72 in an alternating fashion, without rotating with the first clutch member 72 when the latter is driven to rotate in the second direction. Idle rotation of the driving member 50 (see FIG. 4) relative to the hub shell 10 thus occurs.

It has been shown that the first and second clutch members 72, 71 have inclined teeth 723, 713 that are annularly arranged around the shaft 20. The first and second clutch members 72, 71 can thus engage one another more effectively to result in an enhanced transmission between the driving member 50 and the hub shell 10 when compared with the aforementioned conventional freewheel hub. In case one of the inclined teeth 723, 713 is damaged or worn, the interengagement between the first and second clutch members 72, 71 would not be substantially affected. Moreover, since the components of the bicycle freewheel hub of the present invention are sleeved axially around the shaft, assembly thereof can be easily conducted. In particular, since the first and second clutch members 72, 71 have the same configuration, a single mold is needed for manufacturing the first and second clutch members 72, 71. After manufacturing, the annular end faces 726, 716 of the first and second clutch members 72, 71 can be arranged so as to confront one another by reversing one of the first and second clutch members 72, 71 relative to the other. Manufacturing and assembly costs are therefore reduced.

With this invention thus explained, it is apparent that numerous modifications and variations can be made without departing from the scope and spirit of this invention. It is therefore intended that this invention be limited only as indicated in the appended claims.

What is claimed is:

1. A bicycle freewheel hub comprising:

a shaft;

a hollow hub shell sleeved rotatably on said shaft and having first and second ends;

a cylindrical driving member sleeved rotatably on said shaft and having a first end disposed adjacent to said second end of said hub shell;

a clutch unit which includes first and second clutch members sleeved rotatably on said shaft, said first clutch member being coupled to said first end of said driving member and having an annular end face which extends in a direction substantially perpendicular to said shaft, said annular end face having inclined teeth that are arranged annularly around said shaft and that project axially from said annular end face, said second clutch member being coupled to said second end of said hub shell and having an annular end face which extends in a direction substantially perpendicular to said shaft and which confronts said annular end face of said first clutch member, said annular end face of said second clutch member having inclined teeth that are arranged annularly around said shaft and that project axially from said annular end face of said second clutch member to engage said inclined teeth of said first clutch member when said cylindrical driving member rotates in a first direction and to disengage therefrom when said cylindrical driving member rotates in a second direction opposite to said first direction; and spring means for biasing one of said first and second clutch members so as to keep interengagement of said first and second clutch members, wherein each of said first and second clutch members includes an annular disc which has two opposite end faces, one of which defines said annular end face and said inclined teeth, the other one of said two opposite end faces being substantially planar and extending perpendicularly to said shaft.

2. A bicycle freewheel hub as claimed in claim 1, wherein said first and second clutch members correspond with one another in size and shape.

3. A bicycle freewheel hub as claimed in claim 1, wherein said first and second clutch members correspond with one another in size and shape.

4. A bicycle freewheel hub as claimed in claim 3, wherein each of said inclined teeth is defined by a first radially extending surface that projects perpendicularly from said annular end face and that has a distal end, and an inclined second surface that extends slantwise from said annular end face to said distal end of said first radially extending surface.

5. A bicycle freewheel hub comprising:

a shaft;

a hollow hub shell sleeved rotatably on said shaft and having first and second ends;

a cylindrical driving member sleeved rotatably on said shaft and having a first end disposed adjacent to said second end of said hub shell;

a clutch unit which includes first and second clutch members sleeved rotatably on said shaft, said first clutch member being coupled to said first end of said driving member and having an annular end face which extends in a direction substantially perpendicular to said shaft, said annular end face having inclined teeth that are arranged annularly around said shaft and that project axially from said annular end face, said second clutch member being coupled to said second end of said hub shell and having an annular end face which extends in a direction substantially perpendicular to said shaft and which confronts said annular end face of said first clutch member, said annular end face of said second clutch member having inclined teeth that are arranged annularly around said shaft and that project axially from said annular end face of said second clutch member to engage said inclined teeth of said first clutch member when said cylindrical driving member rotates in a first direction and to disengage therefrom when said cylindrical driving member rotates in a second direction opposite to said first direction; and spring means for biasing one of said first and second clutch members so as to keep interengagement of said first and second clutch members;

wherein said first end of said driving member has a first annular groove around said shaft to receive said first clutch member, said second end of said hub shell having a second annular groove disposed around said shaft and communicated with said first annular groove, said second annular groove receiving said second clutch member therein.

6. A bicycle freewheel hub as claimed in claim 5, wherein each of said first and second clutch members includes an annular disc which has two opposite end faces, one of which defines said annular end face and said inclined teeth, the other one of said two opposite end faces being substantially planar and extending perpendicularly to said shaft.

7. A bicycle freewheel hub as claimed in claim 6, wherein said annular disc of each of said first and second clutch members further has an outer periphery provided with a plurality of radially projecting and axially extending projections at intervals.

8. A bicycle freewheel hub as claimed in claim 7, further comprising a tubular clutch seat which is sleeved fixedly around said shaft and which extends in said first and second annular grooves, said annular disc of each of said first and second clutch members being disposed around said tubular clutch seat.

9. A bicycle freewheel hub as claimed in claim 8, wherein said second end of said hub shell has an inner surface which confines said second annular groove and which is formed with a plurality of axially extending and annularly spaced first recesses, a coupling ring which has an outer surface formed with a plurality of axially extending projections that mesh with said first recesses, and an inner surface formed with a plurality of axially extending and annularly spaced second recesses, said second clutch member being received in said coupling ring, said projections of said annular disc of said second clutch member engaging said second recesses of said coupling ring, said first end of said driving member having an inner surface confining said first annular groove and formed with a plurality of axially extending and annularly spaced third recesses, said projections of said annular disc of said first clutch member engaging said third recesses of said driving member.

10. A bicycle freewheel hub as claimed in claim 9, wherein said annular disc of said first clutch member is fitted tightly within said first annular groove so as to prevent axial sliding movement of said first clutch member relative to said driving member, said annular disc of said second clutch member being mounted inside said coupling ring in an axially slidable relationship therewith.

11. A bicycle freewheel hub as claimed in claim 10, wherein said spring means includes a coiled spring which is sleeved around said tubular clutch seat adjacent to said annular disc of said second clutch member.

12. A bicycle freewheel hub as claimed in claim 11, wherein said driving member further has a second end opposite to said first end thereof, and a stepped through-hole extending from said first annular groove to said second end of said driving member, said tubular clutch seat extending from said first annular groove to said stepped through-hole, said driving member further having a needle bearing mounted to said shaft in said stepped through-hole adjacent to said tubular clutch seat.

* * * * *